United States Patent
Caputo et al.

(10) Patent No.: US 11,325,695 B2
(45) Date of Patent: May 10, 2022

(54) ROTOR BLADE INTERNAL STRUCTURE FOR TRAILING EDGE ACTUATION

(71) Applicant: LOCKHEED MARTIN CORPORATION, Bethesda, MD (US)

(72) Inventors: Frank M. Caputo, Cheshire, CT (US); Timothy James Conti, Shelton, CT (US); Claude G. Matalanis, Monroe, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 83 days.

(21) Appl. No.: 16/850,682

(22) Filed: Apr. 16, 2020

(65) Prior Publication Data

US 2021/0323660 A1 Oct. 21, 2021

(51) Int. Cl.
*B64C 27/473* (2006.01)
*B64C 27/00* (2006.01)
*B64C 27/72* (2006.01)

(52) U.S. Cl.
CPC .......... *B64C 27/473* (2013.01); *B64C 27/008* (2013.01); *B64C 2027/7222* (2013.01)

(58) Field of Classification Search
CPC ............... B64C 27/473; B64C 27/008; B64C 2027/7222; B64C 3/50; B64C 9/00; B64C 9/02; B64C 9/10; B64C 9/30
See application file for complete search history.

(56) References Cited

U.S. PATENT DOCUMENTS

| | | | |
|---|---|---|---|
| 6,168,379 B1 * | 1/2001 | Bauer | B64C 27/001 416/23 |
| 6,491,262 B1 | 12/2002 | Kota | |
| 10,435,150 B1 * | 10/2019 | Szefi | B64C 27/72 |
| 2010/0028151 A1 * | 2/2010 | Loftus | B64C 27/008 416/144 |
| 2017/0341744 A1 * | 11/2017 | Kopanski | B64C 13/28 |
| 2019/0055002 A1 * | 2/2019 | Bekircan | B64C 3/50 |

FOREIGN PATENT DOCUMENTS

WO WO-2009000227 A2 * 12/2008 ........... B64C 27/615

* cited by examiner

*Primary Examiner* — Richard A Edgar
(74) *Attorney, Agent, or Firm* — Foley & Lardner LLP

(57) ABSTRACT

A rotor blade of a rotary wing aircraft includes a core defining a trailing edge of the rotor blade and a skin extending from the trailing edge defining an opening including the core. The skin defines an aerodynamic surface of the rotor blade. The rotor blade additionally includes at least one trim tab assembly including a trim portion extending from the core beyond the trailing edge of the rotor blade and an actuation system including at least one actuator disposed within the core. The actuation system is operable to adjust an angle of the trim portion relative to the rotor blade.

19 Claims, 8 Drawing Sheets

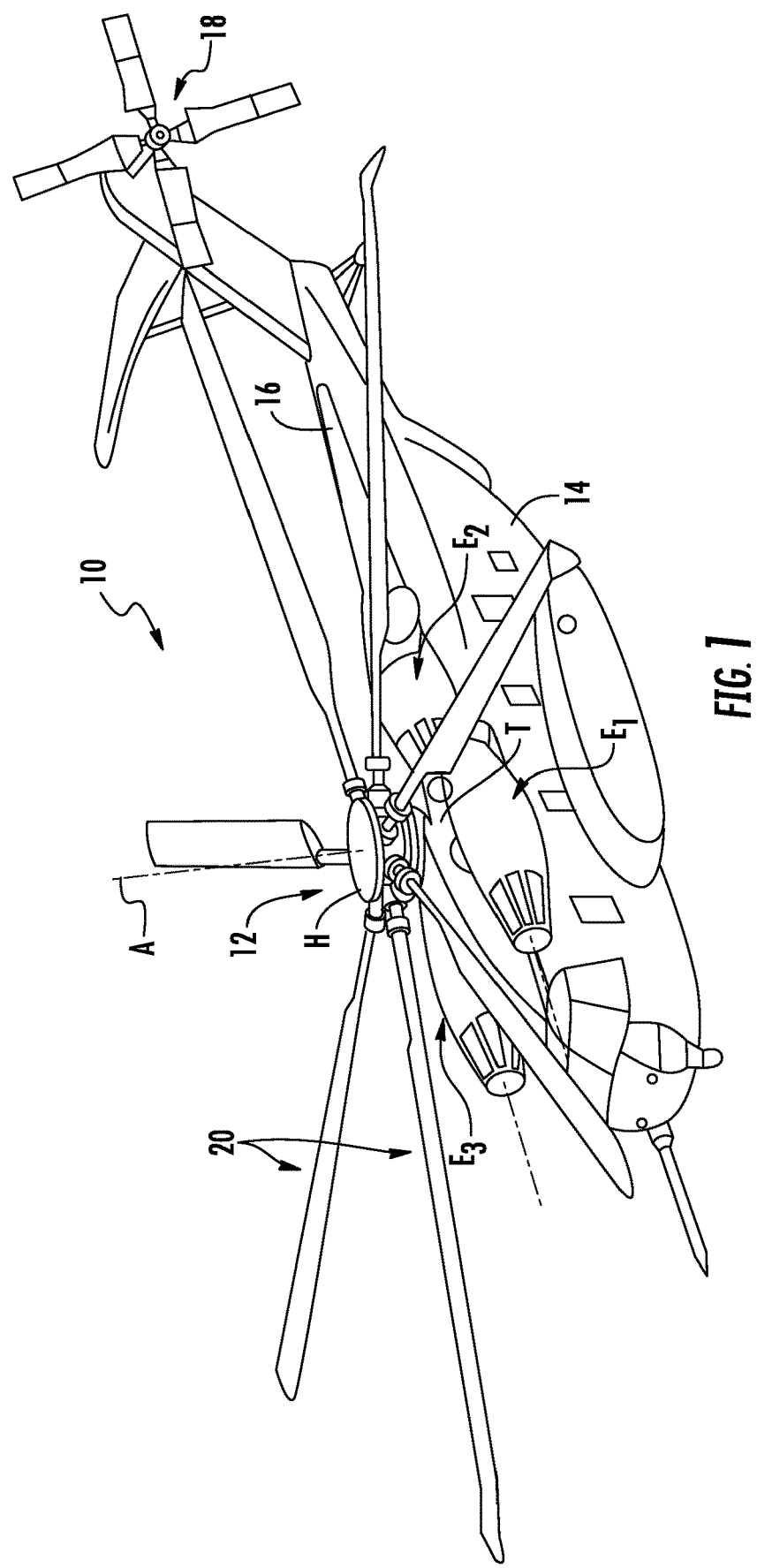

ROTOR BLADE INTERNAL STRUCTURE FOR TRAILING EDGE ACTUATION

BACKGROUND

The subject matter disclosed herein relates to a rotor system for a rotary wing aircraft and, more particularly, to an actuation system for adjusting a trailing edge control surface of a rotor blade of a rotor system for a rotary wing aircraft.

Rotary wing aircraft, such as helicopters, have main rotor blades that typically include a trim tab extending from the trailing edge of the rotor blades. The trim tab can be bent along its length about a spanwise axis to change the effective airfoil shape and thus change the lift, drag, and pitch-moment coefficients of the rotor blade airfoil at the spanwise position of the trim tab. The ability to adjust these local airfoil parameters increases the amount of adjustment available to control global blade characteristics, such as high-speed efficiency, figure-of-merit, pitching-moment slope, track, flutter stability, vibration, and bending mode shapes.

In existing rotary wing aircraft, the trim tabs are typically formed as discrete sections that are connected to the blade after manufacture, such as by machining out a portion of the rotor blade or by mounting the trim tab to a surface of the rotor blade. In addition, an angle of the trim tab relative to the rotor blade is not typically adjustable to achieve different aerodynamic properties based on a flight condition.

BRIEF DESCRIPTION

According to an embodiment, a rotor blade of a rotary wing aircraft includes a core defining a trailing edge of the rotor blade and a skin extending from the trailing edge defining an opening including the core. The skin defines an aerodynamic surface of the rotor blade. The rotor blade additionally includes at least one trim tab assembly including a trim portion extending from the core beyond the trailing edge of the rotor blade and an actuation system including at least one actuator disposed within the core. The actuation system is operable to adjust an angle of the trim portion relative to the rotor blade.

In addition to one or more of the features described above, or as an alternative, in further embodiments the at least one trim tab assembly further comprises a support member coupled to the trim portion and connected to the skin and core.

In addition to one or more of the features described above, or as an alternative, in further embodiments the support member is integrally formed with the trim portion.

In addition to one or more of the features described above, or as an alternative, in further embodiments the rotor blade further comprises a spar, and a portion of the support member is arranged in contact with the spar.

In addition to one or more of the features described above, or as an alternative, in further embodiments comprising a cavity formed within the core, the at least one actuator being arranged within the cavity.

In addition to one or more of the features described above, or as an alternative, in further embodiments the skin comprises an upper skin arranged at an upper surface of the core and a lower skin arranged at a lower surface of the core, wherein the upper skin is affixed to a first surface of the trim portion extending beyond the trailing edge of the rotor blade and the lower skin is affixed to a second surface of the trim portion extending beyond the trailing edge of the rotor blade.

In addition to one or more of the features described above, or as an alternative, in further embodiments the support member is arranged in contact with at least one of the upper skin and the lower skin at the cavity.

In addition to one or more of the features described above, or as an alternative, in further embodiments the support member includes a stopping feature to limit the motion of the trim portion.

In addition to one or more of the features described above, or as an alternative, in further embodiments a portion of at least one of the upper skin and the lower skin aligned within the cavity includes a depression, and the depression defines an axis about which the trailing edge of the rotor blade is movable.

In addition to one or more of the features described above, or as an alternative, in further embodiments the at least one actuator is selectively operable to apply a force to the trim portion to adjust the angle of the trim portion.

In addition to one or more of the features described above, or as an alternative, in further embodiments the at least one actuator is selectively operable to apply a force to one of the upper skin and the lower skin to adjust the angle of the trim portion.

In addition to one or more of the features described above, or as an alternative, in further embodiments the at least one actuator includes a first actuator operable to adjust the trim portion in a first direction and a second actuator operable to adjust the trim portion in a second, opposite direction.

In addition to one or more of the features described above, or as an alternative, in further embodiments the at least one trim tab assembly includes a first trim tab assembly and a second trim tab assembly, the second trim tab assembly being spaced from the first trim tab assembly along a span of the rotor blade.

In addition to one or more of the features described above, or as an alternative, in further embodiments the first trim tab assembly and the second trim tab assembly are operable independently.

In addition to one or more of the features described above, or as an alternative, in further embodiments the trim portion of the first trim tab assembly is movable in a first direction relative to the trailing edge of the rotor blade and the trim portion of the second trim tab assembly is movable in a second, opposite direction relative to the trailing edge of the rotor blade.

In addition to one or more of the features described above, or as an alternative, in further embodiments the first trim tab assembly has a first configuration and the second trim tab assembly has a second configuration, different from the first configuration.

According to another embodiment, a rotary wing aircraft includes a fuselage, an engine disposed in the fuselage, and a main rotor system disposed on the fuselage. The main rotor system includes a rotor hub rotatable about an axis according to the power supplied by the engine and at least one rotor blade rotatable about the axis defined by the rotor hub. The at least one rotor blade includes a trim tab assembly having a trim portion extending from a trailing edge of the at least one rotor blade; and an actuation system arranged within an interior of the at least one rotor blade. The actuation system being operably coupled to the trim portion to adjust a position of the trim portion relative to the rotor blade.

In addition to one or more of the features described above, or as an alternative, in further embodiments the at least one rotor blade further comprises a core having a cavity formed therein, an upper skin arranged adjacent an upper surface of the core and a lower skin arranged adjacent a lower surface of the core, wherein a portion of at least one of the upper skin and the lower skin aligned within the cavity includes a depression that defines a bend axis about which the trailing edge of the rotor blade is movable.

In addition to one or more of the features described above, or as an alternative, in further embodiments the actuation system includes at least one actuator, the at least one actuator being disposed within the cavity.

In addition to one or more of the features described above, or as an alternative, in further embodiments the at least one actuator is selectively operable to apply a force to at least one of the trim portion, the upper skin, and the lower skin to adjust the position of the trim portion relative to the rotor blade.

BRIEF DESCRIPTION OF THE DRAWINGS

The following descriptions should not be considered limiting in any way. With reference to the accompanying drawings, like elements are numbered alike:

FIG. 1 is a perspective side view of an example of a rotary wing aircraft;

DETAILED DESCRIPTION

Figure 2A:
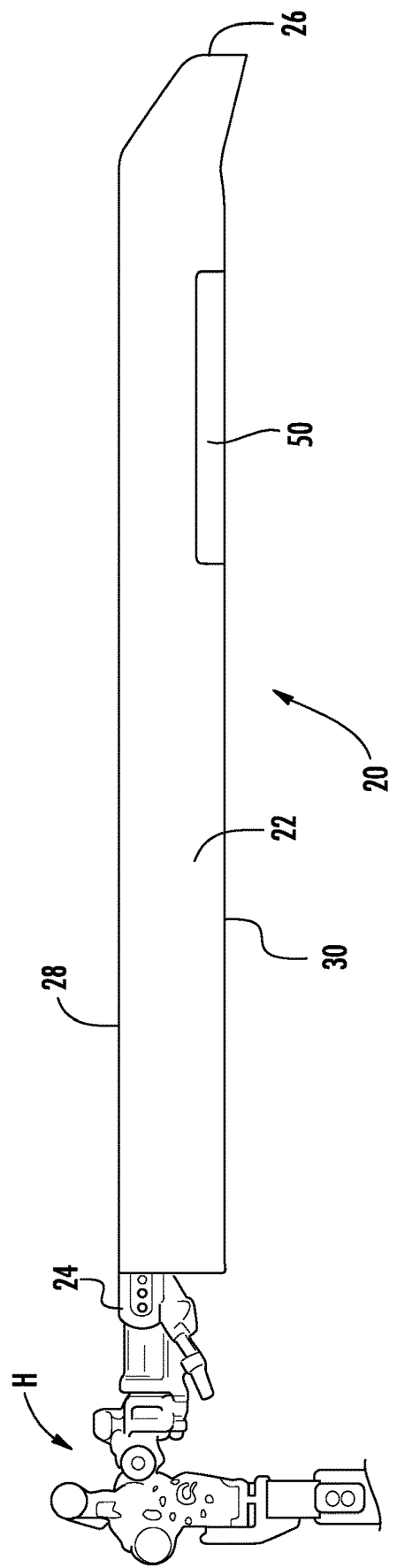
FIG. 2A is a plan view of an example of a rotor blade or a rotary wing aircraft.

A detailed description of one or more embodiments of the disclosed apparatus and method are presented herein by way of exemplification and not limitation with reference to the Figures.

Referring the FIG. 1, an example of a vertical takeoff and landing (VTOL) rotary-wing aircraft 10 having a main rotor system 12, such as a helicopter for example, is illustrated. As shown, the aircraft 10 includes an airframe 14 having an extending tail 16 which mounts a tail rotor system 18, such as an anti-torque system. The main rotor system 12 is driven about an axis of rotation A via a main gearbox, illustrated schematically at T, by one or more engines, illustrated at E1-E3. The main rotor system 12 includes a plurality of rotor blade assemblies 20 mounted to a rotor hub assembly H. Although a particular helicopter configuration is illustrated and described in the disclosed non-limiting embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present disclosure.

FIG. 2A schematically illustrates an example of a main rotor blade assembly 20 configured to rotate about the axis of rotation A. The main rotor blade assembly 20 includes a main rotor blade 22 having an inboard section arranged adjacent a root end 24 configured to attach to the rotor hub H, an outboard section including a tip end 26 located at the radially outermost point of the rotor blade 22, and an intermediate section disposed between the inboard and outboard sections. A blade radius R is defined between the axis of rotation A and the blade tip 26.

Figure 2B:
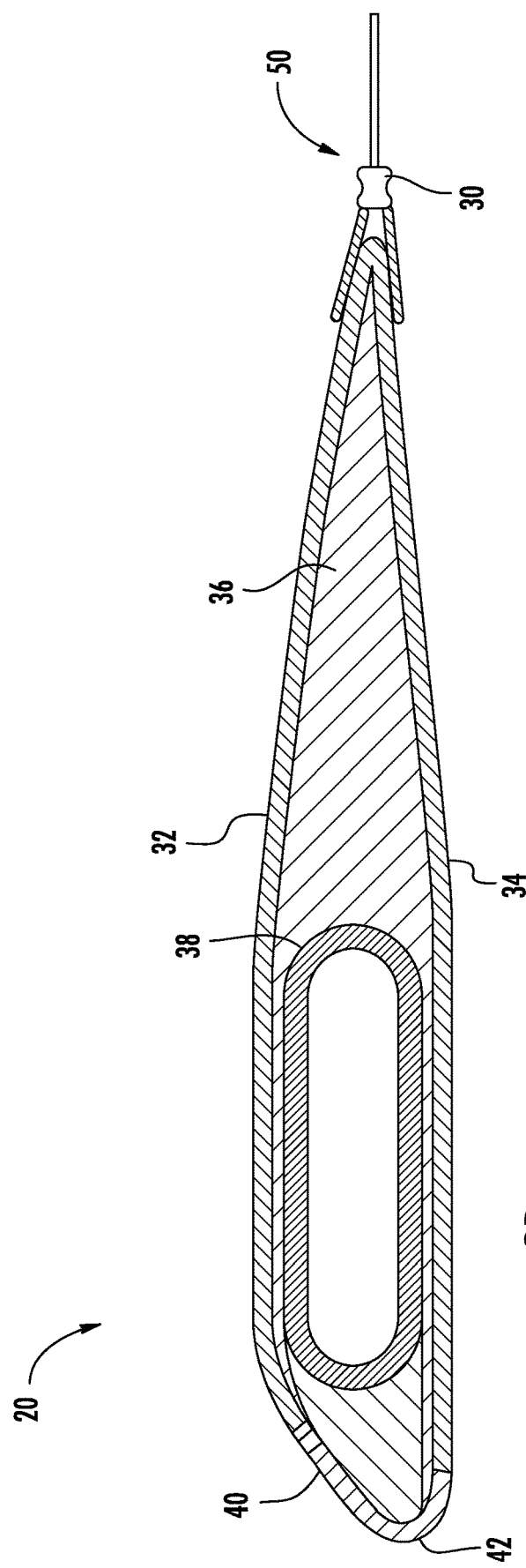
FIG. 2B is a cross-sectional view of the rotor blade of FIG. 2A.

The main rotor blade 22 has a leading edge 28 and a trailing edge 30, which define the chord C of the main rotor blade. As best shown in FIG. 2B, upper and lower skins 32, 34 define the upper and lower aerodynamic surface of the main rotor blade. A core 36, such as formed from a honeycomb material, a spar 38, one or more counterweights 40, and a leading edge sheath 42 typically form the interior support for the skins 32, 34 of the main rotor blade 22. It should be understood that relative positional terms such as "forward," "aft," "upper," "lower," "above," "below," and the like are with reference to are normal operational attitude of the vehicle and should not be considered otherwise limiting.

With continued reference to FIGS. 2A and 2B, a control surface 50, such as a trim tab assembly 50 for example, is located at and extends rearwardly from the trailing edge 30 of the main rotor blade 22. Although a trim tab assembly 50 is illustrated, it should be appreciated that other types of control surfaces are also contemplated herein, such as conformal flaps, active flow control devices, unsteady or steady blowing devices, flaps, mass displacement devices, etc. In an embodiment, the control surface 50 is adjustable or articulable relative to the trailing edge 30 of the rotor blade 22.

Figure 3:
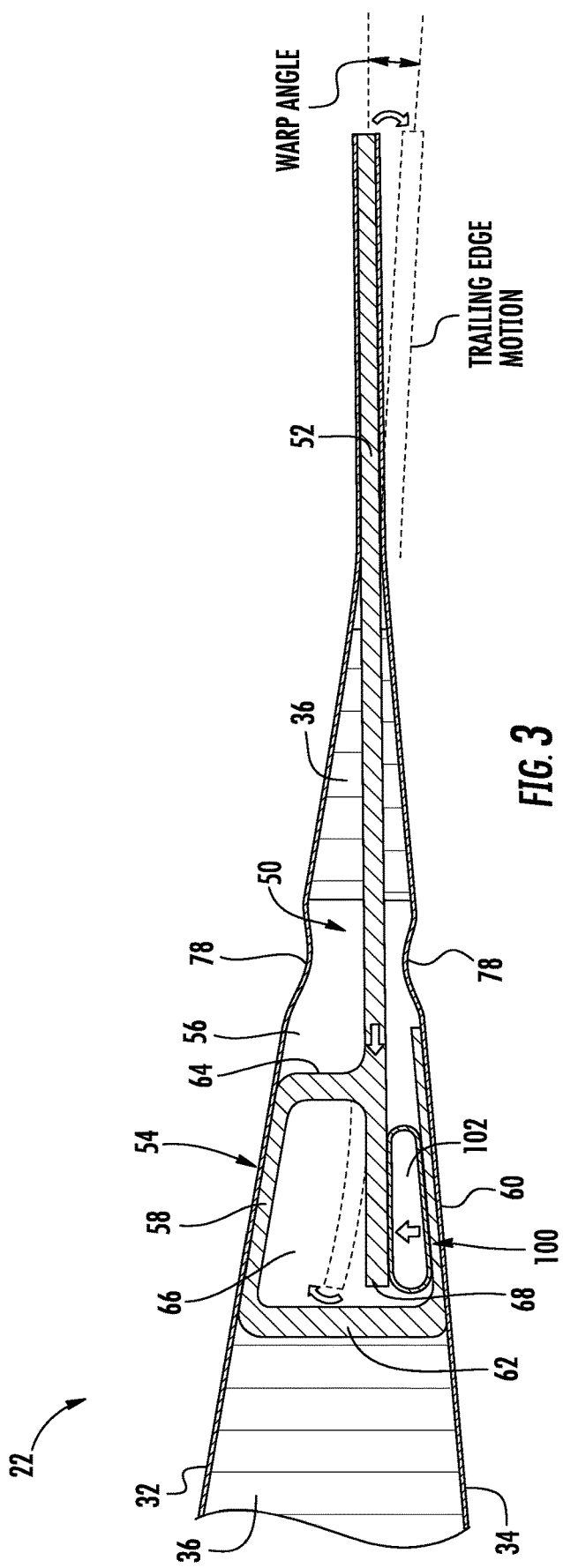
FIG. 3 is a cross-sectional view of a trailing edge section of a rotor blade according to an embodiment.
Figure 4:
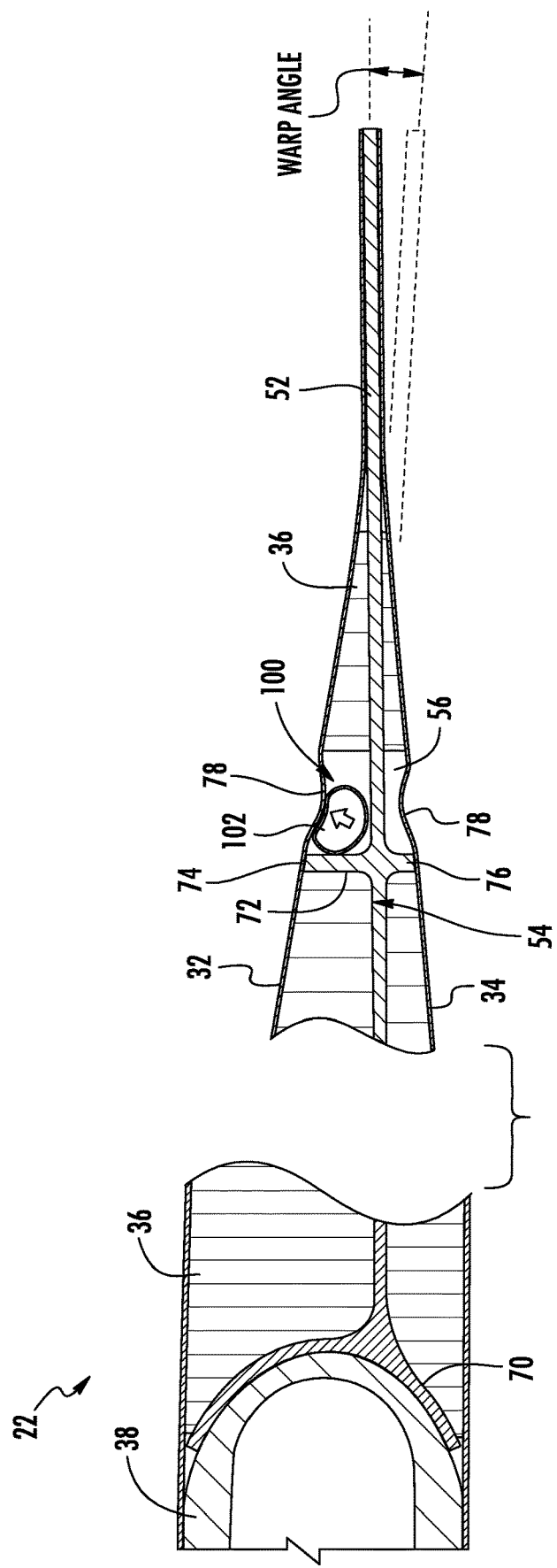
FIG. 4 is a cross-sectional view of a trailing edge section of a rotor blade according to an embodiment.

Referring to FIGS. 3-4, an expanded view of the trailing edge 30 of a main rotor blade 22 and a trim tab assembly 50 associated therewith is illustrated in more detail according to several embodiments. In an embodiment, the trim tab assembly 50 includes a trim portion 52 arranged at and/or extending from the trailing edge 30 of the rotor blade 22. As shown, the trim portion 52 includes a body having a generally planar configuration. However, embodiments where the trim portion 52 has another configuration are also within the scope of the disclosure. In an embodiment, at least one of the upper skin 32 and the lower skin 34 is affixed to an adjacent surface of the trim portion 52 exposed at the aft end of the rotor blade 22, such as the part of the trim portion 52 that extends beyond the adjacent core 36. The skins 32, 34 may be affixed to the trim portion 52 via an adhesive, lamination, or any suitable connection mechanism.

A support member 54 is operably coupled to or is integrally formed with the trim portion 52. In an embodiment, at least a portion of the support member 54 is positioned within an interior of the main rotor blade 22, such as within a cavity 56 formed in the core 36 for example. The cavity 56 may be located at a central portion of the core 36 such that the material of the core 36 extends both fore and aft of the cavity 56. In an embodiment, the support member 54 of the trim tab assembly 50 is configured to structurally support at least one of the upper and lower skins 32, 34 of the rotor blade 22 over at least a portion of the cavity 56. For example, in the non-limiting embodiment of FIG. 3, the support member 54 includes a first portion 58 arranged in contact with the upper skin 32 and a second portion 60 arranged in contact with the lower skin 34. Further, the portions of the support member configured to contact the upper and lower skins 32, 34 may have a contour complementary to the airfoil shape cross-section of the rotor blade 22.

In an embodiment, the support member 54 is operable to support the trim portion 52 in a cantilevered configuration. With reference again to FIG. 3, the first and second portions 58, 60 of the support member 54 are connected, such as at a first end for example, via a first connecting member 62. The opposite end of the first portion 58 is connected to the body of the trim portion 52 via a second connecting member 64. In an embodiment, the first and second portions 58, 60 and the first and second connecting members 62, 64 are integrally formed as a single body. However, embodiments where the first portion 58, the second portion 60, and the first and second connecting members 62, 64 are formed as separate components that are then affixed to one another are also within the scope of the disclosure. As shown, the first portion 58, the second portion 60, and the first and second connecting members 62, 64 of the support member 54 define an opening 66 there between, and the end 68 of the body of the trim portion 52 extends beyond the second connecting member 64 into the opening 66.

In another embodiment, as shown in FIG. 4, the support member 54 includes a first portion 70 arranged at a first location and a second portion 72 arranged at a second location, spaced from the first portion 70 by a distance. As shown, the first portion 70 has a contour generally complementary to a portion of the spar such the that the first portion 70 may directly abut and overlap a periphery of the end of the spar 38 facing the core 36. However, it should be understood that any portion of the support member 54 may be adapted to abut the spar 38, such as the first connecting member 62 of the embodiment illustrated in FIG. 3 for example.

The second portion or cross piece 72 of the support member 54 extends from the trim portion 52, perpendicular to the chord of the rotor blade 22. Although the first and second portions 70, 72 of the support member are spaced from one another along the blade chord, in an embodiment, the first and second portions 70, 72 may be integrally formed within one another. As shown, a first end 74 of the cross piece 72 is arranged in contact with the upper skin 32 and a second end 76 of the cross piece 72 is arranged in contact with the lower skin 34. As previously described, the cross piece 72 is positioned within a cavity 56 formed in the core 36 of the rotor blade 22. The illustrated support members 54 are intended as an example only and any suitable configuration of a support member 54 is contemplated herein.

A portion of at least one of the upper skin 32 and the lower skin 34 of the rotor blade 22 at the cavity 56 defines a hinge. In the illustrated, non-limiting embodiment, both the upper skin 32 and the lower skin 34 have an inwardly extending depression 78 formed therein. These depressions 78 define a region of compliance within the skins which may function similar to a spring. Specifically, the depressions 78 may define an axis about which the trailing edge 30 of the rotor blade 22 is movable. In embodiments including a depression 78 formed in both the upper and lower skin 32, 34, the depressions 78 may, but need not be, substantially symmetrical about the chord-line of the blade.

Figure 5:
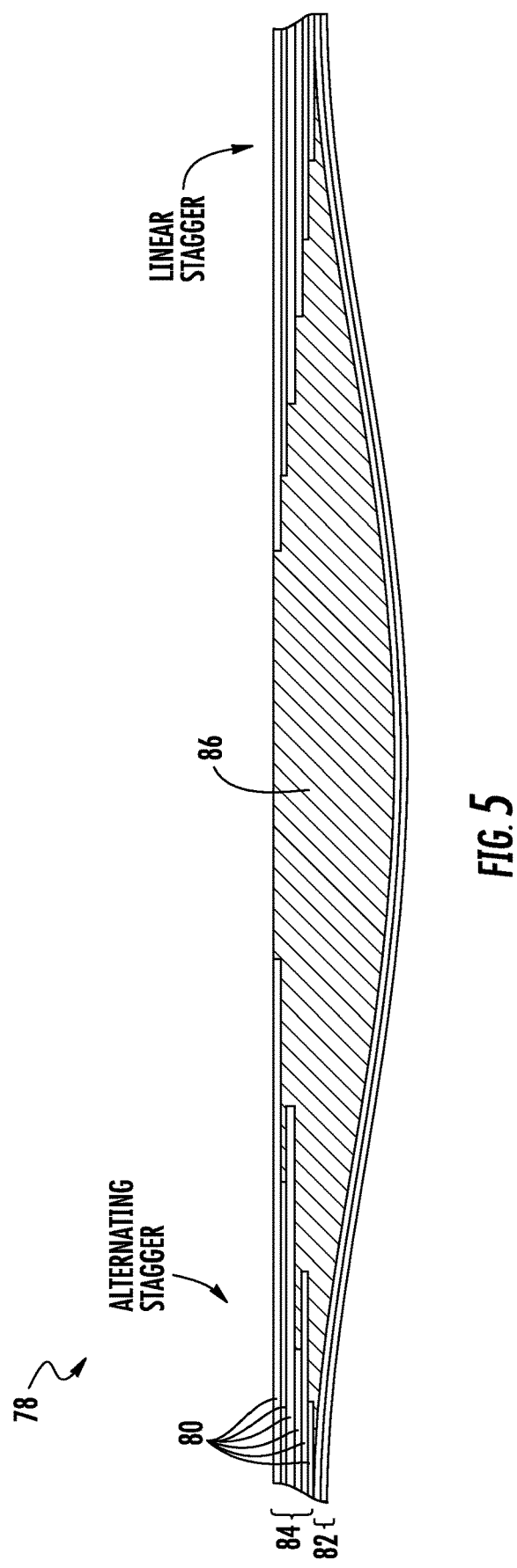
FIG. 5 is a detailed view of a depression formed in the upper skin of the rotor blade according to an embodiment.

The configuration of the skin 32 or 34 may vary across the cavity 56 to define the depression 78. As is known in the art, the skin, such as the upper skin 32 for example, may have a laminate composition formed from a plurality of layers of structural plies 80 stacked on top of one another. In an embodiment, the thickness of the skin 32 at the depression 78 is less than the thickness of the skin 32 adjacent a side of the depression 78. This reduction in thickness may be achieved by reducing the total number of plies 80 that form the skin at the depression 78. As best shown in FIG. 5, as the skin 32 approaches the depression 78, a first portion 82 of the plies 80 extends continuously to the trailing edge of the rotor blade. However, the second portion 84 of the plies 80 stacked on top of the first portion 82 of plies 80 may taper such that the outermost ply of the second portion 84 of the plies 80 has the greatest length and the ply of the second portion 84 of plies 80 arranged directly adjacent the first portion 82 of plies 80 has the shortest length. Inclusion of such a stagger may facilitate even distribution of the load when the trim portion 52 is in a non-neutral position. The length of the plies may taper linearly, or alternatively, intermediate plies may have a reduced length, also referred to herein as alternating stagger. In an embodiment, the depression 78 formed in the skin 32 is filled with a flexible sealant 86. In such embodiments, the total surface area of the plies 80 configured to contact the flexible sealant 86 is increased when the second portion 84 of the plies 80 is formed with an alternating stagger.

Figure 6:
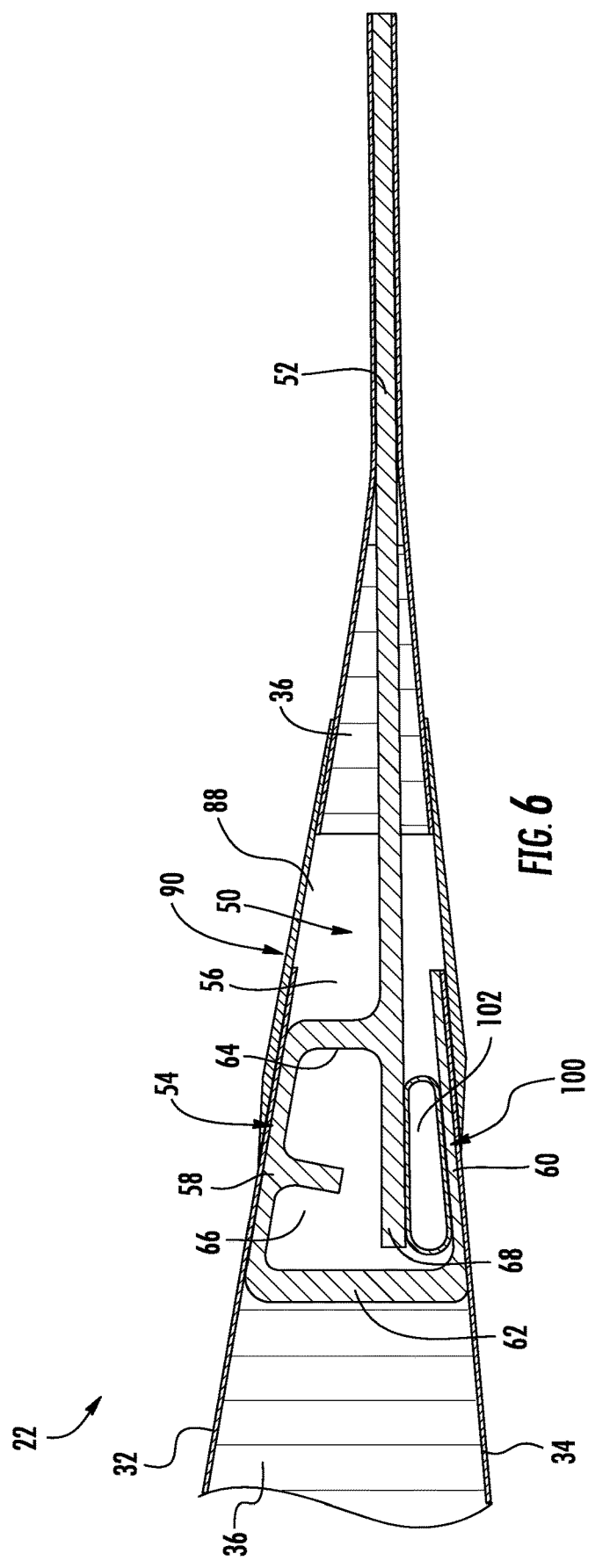
FIG. 6 is a cross-sectional view of a trailing edge section of a rotor blade according to another embodiment.
Figure 7A:
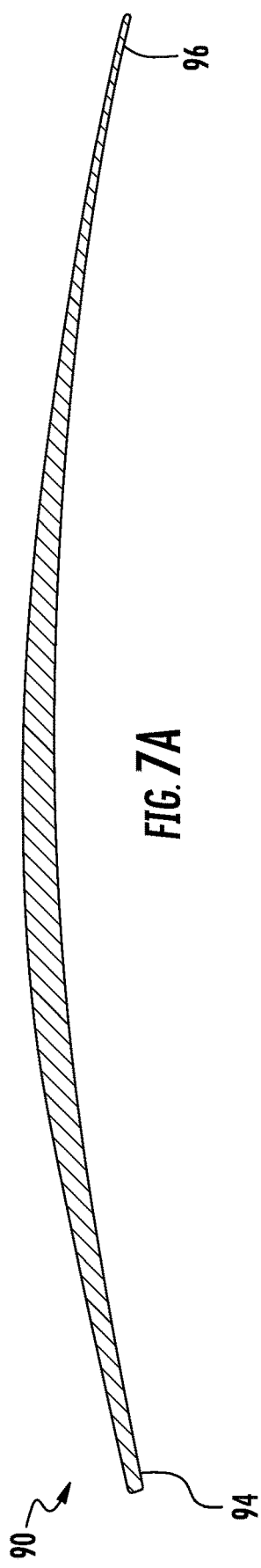
FIGS. 7A and 7B are perspective and detailed views of a bridge suitable for connection with a skin of a rotor blade according to an embodiment.
Figure 7B:
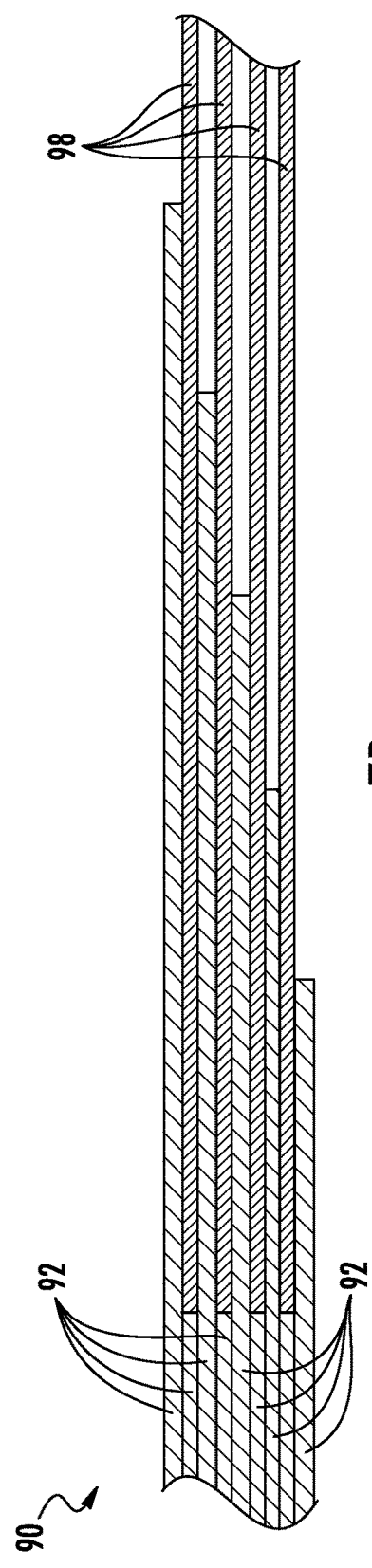

In another embodiment, best shown in FIG. 6, a gap 88 is formed in the portion of at least one of the upper skin 32 and the lower skin 34 directly adjacent the cavity 56. To seal the cavity 56, a patch or bridge 90 formed from a laminate material similar to the skin 32 is mounted in overlapping arrangement with a surface of the ends of the skin 32 adjacent the gap 88, such as the exterior surface of the skin 32 for example. An example of a bridge 90 is illustrated in more detail in FIGS. 7A and 7B. The bridge 90 includes a plurality of layers of structural plies 92 stacked on top of one another. In an embodiment, the bridge 90 may be formed to include a curvature. By forming the bridge 90 with a generally convex configuration, rather than a planar configuration, when the bridge 90 is installed and the trim portion 52 is in a neutral position (no trailing edge pitch), the ends 94, 96 of the bridge 90 maintain contact with the blade surface.

Alternatively, or in addition, one or more ends 94, 96 of the bridge 90 may have a tapered configuration to reduce the step between the skin 32, 34 and the bridge 90, and therefore the drag generated by the bridge 90 during movement of the rotor blade 22. In an embodiment, a removable separator film 98 is disposed between the end of adjacent plies 92 the bridge 90. During installation of the bridge 90, the pieces of separator film 98 are removed therefrom. As a result, the unsupported ends of the plies 92 may slip relative to one another, which will allow compliance of the bridge 90 during actuation of the trim tab assembly 50.

As noted above, the trim portion 52 may be movable relative to the trailing edge 30 of the rotor blade 22. In an embodiment, an actuation system 100 including at least one actuator, illustrated at 102, is arranged within the cavity 56, adjacent a portion of the trim portion 52. For example, in the non-limiting embodiment of FIG. 3, an actuator 102 is arranged adjacent the end 68 of the trim portion 52 for example. Alternatively, as shown in FIG. 4, an actuator 102 may be arranged between the trim portion 52 and a skin, such as the upper skin 32 for example. In an embodiment, the actuator 102 includes a pressurizing device, such as a bladder or bellow; however, it should be understood that any actuator capable of moving the trim portion 52 relative to the trailing edge 30 of the rotor blade 22 is within the scope of the disclosure. The actuator 102 may be formed from any suitable material that does not damage the surface of the trim portion 52 or skin 32, 34 when applying a force thereto.

In the illustrated, non-limiting embodiment, a fluid, such as air or another liquid, is selectively delivered to the hollow interior of the bellow to apply pressure to a surface of the trim portion 52 and/or to an adjacent skin 32, 34. When the actuator 102 exerts a force on the trim portion 52, the pressure applied by the actuator 102 causes the trim portion 52 to flex relative to the support member 54 and to the trailing edge 30. An example of the trim portion 52 in an actuated position is shown in broken lines. As the trim portion 52 moves away from the neutral axis that defines a zero degree angle relative to the trailing edge 30 of the rotor blade 22, the upper and lower skins 32, 34 are configured to bend about the depressions 78 formed therein. Alternatively or in addition, the pressure generated by the actuator 102 may act directly on a skin, such as the upper skin 32, adjacent the depression 78. The force applied to the upper skin 32 may cause the trailing edge 30 of the rotor blade 22, including the trim portion 52, to deflect about the depression 78 with a similar hinge-like motion.

In an embodiment, the pressure applied by the actuator 102 to the trim portion 52 and/or a skin 32, 34 of the rotor blade 22 may be controlled to achieve a desired degree of movement or warp angle of the trim portion 52. Further, as the fluid is removed from the actuator 102, the resiliency of the material of the trim portion 52, the connection with the support member 54, and/or the depressions 78 of the skins 32, 34 will cause the trim portion 52 to bias back to the neutral position.

In the illustrated, non-limiting embodiments, the actuator 102 positioned within the cavity 56 adjacent the trim portion 52 is operable to move the trim portion 52 between a neutral position and a negative angle. However, in other embodiments, the actuation system may include an actuator 102 arranged at another location, operable to transition the trim portion 52 between the neutral position and a positive angle. Further, it should be understood that a rotor blade 22 may have several trim tab assemblies 50 arranged over the span of the rotor blade 22. In such instances, the trim tab assemblies 50 may be identical, or alternatively, may have varying configurations. Further, during operation, the at least one actuator 102 of each trim tab assembly 50 may be used to adjust the position of each respective trim portion 52 independently. As a result, adjacent trim portions 52 may be maneuvered in the same direction or opposite directions and to achieve the same angle or different angles. Additionally, in an embodiment, the support member 54, may include a stopping feature to limit movement of the trim portion 52 from the neutral position in either a positive or negative direction.

As illustrated and described herein, the trim tab assembly 50 including an actuation system 100 for adjusting the position of the trim tab is integrated into the interior of the rotor blade 22. As a result, the actuation system 100 of the trim tab assembly 50 will be protected from the environment while providing desired aerodynamic benefits. While not required, the actuation system 100 can include a pump which is activated to inflate or deflate the actuator 102 in accordance with signals from a computer, such as a flight control computer.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotor blade of a rotary wing aircraft comprising:
   a core defining a trailing edge of the rotor blade;
   skin extending from the trailing edge defining an opening including the core, the skin defining an aerodynamic surface; and
   at least one trim tab assembly including:
      a trim portion extending from the core beyond the trailing edge of the rotor blade;
      an actuation system including at least one actuator disposed within the core, the actuation system being operable to adjust an angle of the trim portion relative to the rotor blade; and
      a support member coupled to the trim portion and connected to the skin and the core.

2. The rotor blade of claim 1, wherein the support member is integrally formed with the trim portion.

3. The rotor blade of claim 1, wherein the rotor blade further comprises a spar, and a portion of the support member is arranged in contact with the spar.

4. The rotor blade of claim 1, further comprising a cavity formed within the core, the at least one actuator being arranged within the cavity.

5. The rotor blade of claim 4, wherein the skin comprises an upper skin arranged at an upper surface of the core and a lower skin arranged at a lower surface of the core, wherein the upper skin is affixed to a first surface of the trim portion extending beyond the trailing edge of the rotor blade and the lower skin is affixed to a second surface of the trim portion extending beyond the trailing edge of the rotor blade.

6. The rotor blade of claim 5, wherein the support member is arranged in contact with at least one of the upper skin and the lower skin at the cavity.

7. The rotor blade of claim 5, wherein the support member includes a stopping feature to limit the motion of the trim portion.

8. The rotor blade of claim 5, wherein a portion of at least one of the upper skin and the lower skin aligned within the cavity includes a depression, and the depression defines an axis about which the trailing edge of the rotor blade is movable.

9. The rotor blade of claim 5, wherein the at least one actuator is selectively operable to apply a force to the trim portion to adjust the angle of the trim portion.

10. The rotor blade of claim 5, wherein the at least one actuator is selectively operable to apply a force to one of the upper skin and the lower skin to adjust the angle of the trim portion.

11. The rotor blade of claim 1, wherein the at least one actuator includes a first actuator operable to adjust the trim portion in a first direction and a second actuator operable to adjust the trim portion in a second, opposite direction.

12. The rotor blade of claim 1, wherein the at least one trim tab assembly includes a first trim tab assembly and a second trim tab assembly, the second trim tab assembly being spaced from the first trim tab assembly along a span of the rotor blade.

13. The rotor blade of claim 12, wherein the first trim tab assembly and the second trim tab assembly are operable independently.

14. The rotor blade assembly of claim 13, wherein the trim portion of the first trim tab assembly is movable in a first direction relative to the trailing edge of the rotor blade and the trim portion of the second trim tab assembly is movable in a second, opposite direction relative to the trailing edge of the rotor blade.

15. The rotor blade assembly of claim 12, wherein the first trim tab assembly has a first configuration and the second trim tab assembly has a second configuration, different from the first configuration.

16. A rotary wing aircraft comprising:
a fuselage;
an engine disposed in the fuselage; and
a main rotor system disposed on the fuselage, the main rotor system comprising
a rotor hub rotatable about an axis according to power supplied by the engine;
at least one rotor blade rotatable about the axis defined by the rotor hub, the at least one rotor blade comprising:
a core defining a trailing edge of the at least one rotor blade;
skin extending from the trailing edge defining an opening including the core, the skin defining an aerodynamic surface; and
a trim tab assembly including:
a trim portion extending from a trailing edge of the at least one rotor blade;
an actuation system arranged within an interior of the at least one rotor blade, the actuation system being operably coupled to the trim portion to adjust a position of the trim portion relative to the at least one rotor blade; and
a support member coupled to the trim portion and connected to the skin and the core.

17. The rotary wing aircraft of claim 16, wherein the skin comprises an upper skin arranged adjacent an upper surface of the core and a lower skin arranged adjacent a lower surface of the core, and wherein a portion of at least one of the upper skin and the lower skin aligned within the cavity includes a depression that defines a bend axis about which the trailing edge of the rotor blade is movable.

18. The rotary wing aircraft of claim 17, wherein the actuation system includes at least one actuator, the at least one actuator being disposed within the cavity.

19. The rotary wing aircraft of claim 18, wherein the at least one actuator is selectively operable to apply a force to at least one of the trim portion, the upper skin, and the lower skin to adjust the position of the trim portion relative to the rotor blade.

* * * * *